United States Patent [19]
Hillis

[11] Patent Number: 4,993,028
[45] Date of Patent: Feb. 12, 1991

[54] ERROR DETECTION AND CORRECTION CODING

[75] Inventor: W. Daniel Hillis, Brookline, Mass.

[73] Assignee: Thinking Machines Corporation, Cambridge, Mass.

[21] Appl. No.: 241,921

[22] Filed: Sep. 7, 1988

[51] Int. Cl.$^5$ ............................................. G06F 11/10
[52] U.S. Cl. .................................. 371/39.1; 371/38.1; 371/40.1
[58] Field of Search ..................... 371/38, 39, 40, 38.1, 371/39.1, 40.1

[56] References Cited

U.S. PATENT DOCUMENTS

| | | | |
|---|---|---|---|
| 4,345,328 | 8/1982 | White | 371/38 |
| 4,617,664 | 10/1986 | Aichelmann et al. | 371/38 |
| 4,796,222 | 1/1989 | Aichelmann, Jr. et al. | 364/900 |

OTHER PUBLICATIONS

Worley, et al., "Ardent's Fast Memory", VLSI Systems Design, pp. 50–59, Aug. 1988.

Primary Examiner—Charles E. Atkinson

[57] ABSTRACT

A method of detecting bit errors in a possibly corrupted version of an original data word, the bits of the original data word (e.g., a 32-bit data word) being organized in nibbles of four bits each, each nibble being stored in a single four-bit memory chip. In the method, the unique combinations of data word bits used for deriving a first set of check bits are chosen so that the existence of any three bit errors or four bit errors within a single nibble of the possibly corrupted version will be detectable based on a first set of syndrome bits formed by comparing each original check bit of the first set with a corresponding new check bit.

19 Claims, 3 Drawing Sheets

| $D_n$ | CHIP 8 | | | | CHIP 9 | | | | |
|---|---|---|---|---|---|---|---|---|---|
| | $C_0$ | $C_1$ | $C_2$ | $C_3$ | $C_4$ | $C_5$ | $C_6$ | $C_7$ | |
| 0 | 0 | 1 | 1 | 1 | 1 | 0 | 0 | 0 | CHIP 0 |
| 1 | 1 | 0 | 1 | 1 | 1 | 0 | 0 | 0 | |
| 2 | 1 | 1 | 0 | 1 | 1 | 0 | 0 | 0 | |
| 3 | 1 | 1 | 1 | 0 | 1 | 0 | 0 | 0 | |
| 4 | 0 | 1 | 1 | 1 | 0 | 1 | 0 | 0 | CHIP 1 |
| 5 | 1 | 0 | 1 | 1 | 0 | 1 | 0 | 0 | |
| 6 | 1 | 1 | 0 | 1 | 0 | 1 | 0 | 0 | |
| 7 | 1 | 1 | 1 | 0 | 0 | 1 | 0 | 0 | |
| 8 | 0 | 1 | 1 | 1 | 0 | 0 | 1 | 0 | CHIP 2 |
| 9 | 1 | 0 | 1 | 1 | 0 | 0 | 1 | 0 | |
| 10 | 1 | 1 | 0 | 1 | 0 | 0 | 1 | 0 | |
| 11 | 1 | 1 | 1 | 0 | 0 | 0 | 1 | 0 | |
| 12 | 0 | 1 | 1 | 1 | 0 | 0 | 0 | 1 | CHIP 3 |
| 13 | 1 | 0 | 1 | 1 | 0 | 0 | 0 | 1 | |
| 14 | 1 | 1 | 0 | 1 | 0 | 0 | 0 | 1 | |
| 15 | 1 | 1 | 1 | 0 | 0 | 0 | 0 | 1 | |
| 16 | 0 | 1 | 1 | 1 | 0 | 1 | 1 | 1 | CHIP 4 |
| 17 | 1 | 0 | 1 | 1 | 0 | 1 | 1 | 1 | |
| 18 | 1 | 1 | 0 | 1 | 0 | 1 | 1 | 1 | |
| 19 | 1 | 1 | 1 | 0 | 0 | 1 | 1 | 1 | |
| 20 | 0 | 1 | 1 | 1 | 1 | 0 | 1 | 1 | CHIP 5 |
| 21 | 1 | 0 | 1 | 1 | 1 | 0 | 1 | 1 | |
| 22 | 1 | 1 | 0 | 1 | 1 | 0 | 1 | 1 | |
| 23 | 1 | 1 | 1 | 0 | 1 | 0 | 1 | 1 | |
| 24 | 0 | 1 | 1 | 1 | 1 | 1 | 0 | 1 | CHIP 6 |
| 25 | 1 | 0 | 1 | 1 | 1 | 1 | 0 | 1 | |
| 26 | 1 | 1 | 0 | 1 | 1 | 1 | 0 | 1 | |
| 27 | 1 | 1 | 1 | 0 | 1 | 1 | 0 | 1 | |
| 28 | 0 | 1 | 1 | 1 | 1 | 1 | 1 | 0 | CHIP 7 |
| 29 | 1 | 0 | 1 | 1 | 1 | 1 | 1 | 0 | |
| 30 | 1 | 1 | 0 | 1 | 1 | 1 | 1 | 0 | |
| 31 | 1 | 1 | 1 | 0 | 1 | 1 | 1 | 0 | |

FIG.1

| | Number of Bits Set in Syndrome $C_0$-$C_3$ | $C_4$-$C_7$ | Type of Error |
|---|---|---|---|
| a | 0 | 0 | none |
| b | 0 | 1 | single check bit |
| c | 0 | 2 | double check bits (same chip) or double data bits (diff. chips) |
| d | 0 | 3 | multiple |
| e | 0 | 4 | double or quadruple in same chip |
| f | 1 | 0 | single in $C_0$-$C_3$ |
| g | 1 | 1 | double in check $C_0$-$C_3$ bits (two chips) or triple data bits (one chip) |
| h | 1 | 2 | multiple |
| i | 1 | 3 | multiple |
| j | 1 | 4 | multiple |
| k | 2 | 0 | double (same chip) |
| l | 2 | 1 | double |
| m | 2 | 2 | double in data bits (two chips) |
| n | 2 | 3 | double |
| o | 2 | 4 | double in data bits (two chips) |
| p | 3 | 0 | double; or triple in $C_0$-$C_3$ bits |
| q | 3 | 1 | single in data bits |
| r | 3 | 2 | double |
| s | 3 | 3 | single in data bits |
| t | 3 | 4 | double |
| u | 4 | 0 | multiple; quadruple in same data chip |
| v | 4 | 1 | double |
| w | 4 | 2 | multiple |
| x | 4 | 3 | double |
| y | 4 | 4 | multiple |

FIG. 2

ERROR DETECTION AND CORRECTION CODING

BACKGROUND OF THE INVENTION

This invention relates to error detection and correction codes.

Such codes are useful, for example, in detecting and correcting bit errors in data words stored in memory chips.

Aichelmenn, Jr., U.S. Pat. No. 4,617,664, discusses an error correction code in which the 32 bits of each data word are stored as four eight-bit bytes on eight four-bit memory chips. The first bits of all four bytes are stored in one memory chip; the second bits of all four bytes in a second memory chip; and so on. Four parity bits and four check bits are derived from the data word using a generator matrix. Each parity bit applies to one byte of the data word. Each check bit is based on a predetermined combination of bits from all of the data bytes. Later, when the possibly corrupted data word is retrieved, new parity bits and check bits are derived (using the same generator matrix) and a syndrome is formed whose bits indicate the bit positions in which the original parity and check bits differ from the new parity and check bits. Each parity syndrome bit indicates whether an error exists in the corresponding data byte. The parity syndrome bits and the check syndrome bits together may indicate (in accordance with a table) which data bits need to be corrected. Aichelman's code can correct some three bit errors and some four bit errors appearing in any one of the four-bit data chips, and can detect other bit errors.

In general, multiple bit errors in a data word are more likely to occur on a single memory chip than on different memory chips. For example if four errors occur in a single data word it is highly likely that they will occur on a single failed chip.

SUMMARY OF THE INVENTION

The invention is a coding scheme which enables, among other things, detection of any three bit or four bit errors in any one memory chip.

A general feature of the invention is a method of detecting bit errors in a possibly corrupted version of an original data word, the bits of the original data word (e.g., a 32-bit data word) being organized in nibbles of four bits each, each nibble being stored in a single four-bit memory chip. In the method, the unique combinations of data word bits used for deriving a first set of check bits are chosen so that the existence of any three bit errors or four bit errors within a single nibble of the possibly corrupted version will be detectable based on a first set of syndrome bits formed by comparing each original check bit of the first set with a corresponding new check bit.

Preferred embodiments of the invention include the following features. Each data bit participates in the formation (by exclusive ORing) of fewer than all of the check bits of the first set. In particular, each bit of a given nibble of the data word is used in forming each bit of a unique combination of exactly three of the check bits of the first set. Each check bit of the first set is formed based on the same three bits of all nibbles. The specific unique combinations of data word bits used for deriving the check bits of the first set are defined by the left-hand side of the matrix of FIG. 1. Any four bit errors in the same nibble will cause exactly four of the corresponding syndrome bits to be set. Any three bit errors in the same nibble will cause exactly one of the corresponding syndrome bits to be set.

A second set of four original check bits are also derived (by exclusive NORing) from unique combinations of data word bits chosen so that the existence of any three bit errors or four bit errors within a single nibble of the possibly corrupted version will be detectable based on both first and second sets of syndrome bits. Each data bit participates in the formation of an odd number of the check bits in the second set. All data bits of a given nibble participate in the formation of the same check bits in the second set. Specifically, the data bits participate in the formation of the check bits in the second set in accordance with the right-hand side of the matrix of FIG. 1.

Any single bit error in the possibly corrupted version of the data word will result in an odd number (three) of the syndrome bits of the first set being set, and any two bit errors will result in zero or two syndrome bits of the first set being set. The identity of any single bit error in the data word can be determined based on the two sets of syndrome bits. Bit errors in possibly corrupted versions of the check bits can also be detected.

The invention is particularly useful with multiple bit memory chips and enables detection of any two bit errors in the data bits or in the check bits, and any three or four bit errors occurring on a single memory chip, and will also correct any single bit error. Worley, et al, "Ardent's Fast Memory", *VLSI Systems Design*, August, 1988, p. 50, discusses the importance and difficulty of being able to detect one bit to four bit errors in a single chip. The code is simple and easy to implement.

Other advantages and features will become apparent from the following description of the preferred embodiment and from the claims.

DESCRIPTION OF THE PREFERRED EMBODIMENT

We first briefly describe the drawings.

FIG. 1 is a generator matrix for the check bits of a code.

FIG. 2 is a table of various combinations of syndrome bits for the code.

Figure 3:
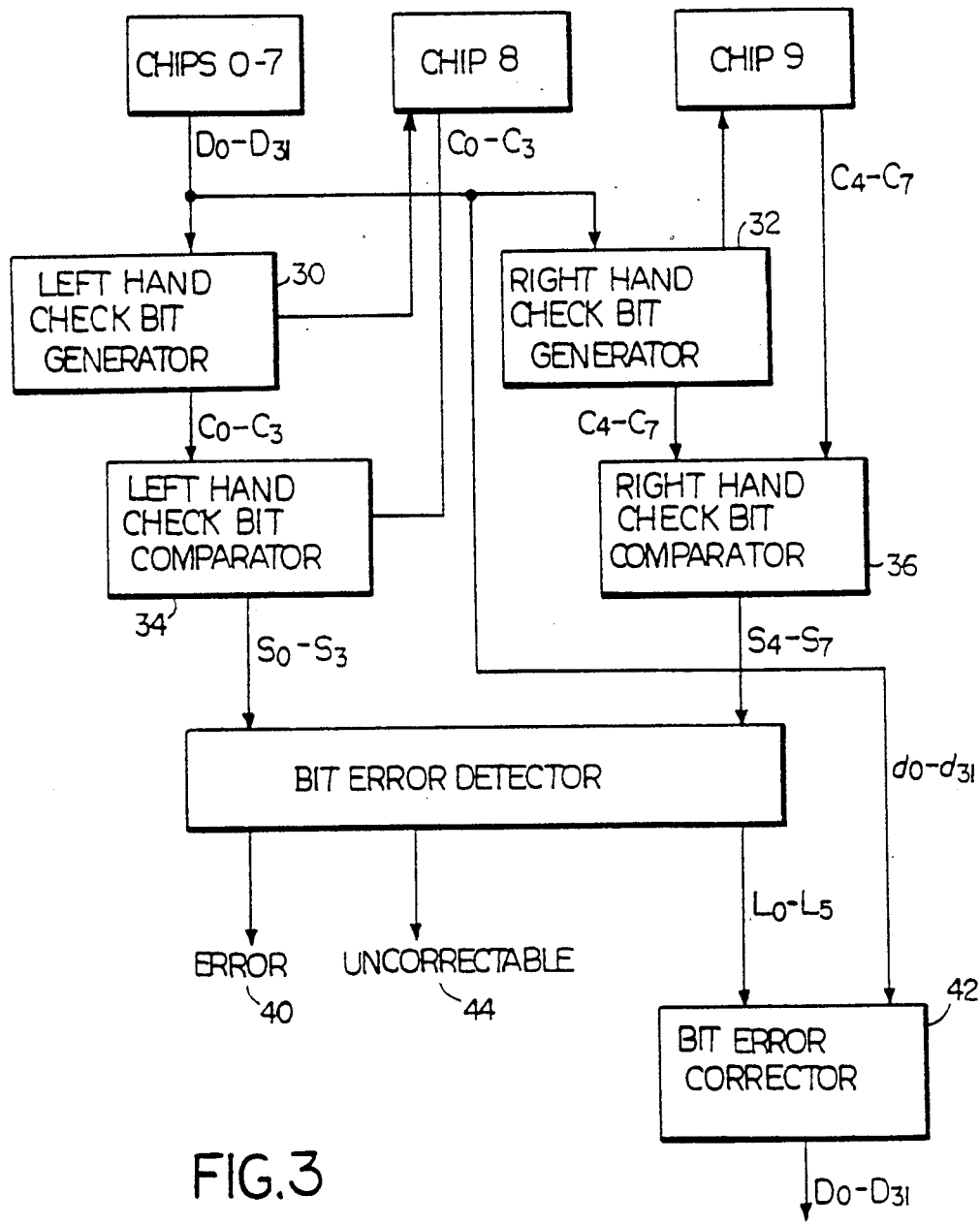
FIG. 3 is a block diagram of circuitry for implementing the code.

Referring to FIG. 1, each one of eight four-bit memory chips 20 (chips 0 through 7) stores a four-bit nibble 22 of a thirty-two bit ($D_0$–$D_{31}$) data word. The bits of the data word are stored in order in the data chips (e.g., bits $D_0$ through $D_3$ are stored in data chip 0). The four bits in each data chip are read and stored simultaneously in parallel with the bits in the other seven data chips. Multiple data words can be stored at different addresses in the data chips.

Two chips 8 and 9 respectively hold two four-bit nibbles worth of error detection and correction bits ($C_0$–$C_3$ and $C_4$–$C_7$) corresponding to each data word stored in the data chips. The bits in chip 8 will be called the left-hand check bits and the bits in chip 9 will be called the right-hand check bits.

The left-hand and right-hand check bits for each word are generated in accordance with a code reflected by the 0 and 1 entries in matrix 26, as follows. Each left-hand check bit is the exclusive ORing of the data bits indicated by the 1s in the corresponding column of the matrix. For example, $C_0$ is the exclusive ORing of the second, third, and fourth bits of each data nibble 22. Each right-hand check bit is the exclusive NORing of the data word bits indicated by the 1s in the corresponding column of the matrix. (Exclusive NORing of two bits results in a 1 only if the original bits were both one or both zero.)

When a possibly corrupt data word and the corresponding original check bits are retrieved from the memory chips 0 through 9, a new set of left-hand and right-hand check bits is formed and compared with the original set to generate two syndrome nibbles. A syndrome bit is set when a new check bit differs from the corresponding original check bit. Analysis of the syndrome bits enables detection and correction of single data bit errors, and detection of two bit errors occurring anywhere, and any three bit or four bit errors occurring on a single chip.

Correcting a single data bit error requires detecting the existence of the error and uniquely identifying the erroneous bit. In the code of FIG. 1, any single data bit error in the first sixteen data bits will set a unique combination of three left hand syndrome bits and one right-hand syndrome bit; the four bits are together sufficient to point uniquely to the one erroneous data bit among those sixteen. Similarly, any single data bit error in the final sixteen data bits will set a unique combination of three left-hand syndrome bits and a unique one of four combinations of three right-hand syndrome bits, again sufficient to point uniquely to the one erroneous data bit among the final sixteen data bits.

Referring to FIG. 2, the detection of a single data bit error is indicated in line q (with respect to an error in the first sixteen data bits) and in line s (with respect to an error in the final sixteen data bits).

To be able to detect any double error, the two errors must produce a combination of check bit changes which is distinguishable from the changes produced by any single data bit error.

It can be seen from the matrix that any two data bit errors will always change an even number (zero or two) of left-hand check bits and an even number (zero, two, or four) of right-hand check bits. These possibilities are reflected in lines c, e, k, m, and o of FIG. 2.

Any two left-hand check bit errors or any two right-hand check bit errors will also change an even number (two) of left-hand or right-hand check bits (lines c and k). Any combination of one data bit error and one left-hand check bit error will cause a change in an even number (two or four) of left-hand check bits, and an odd number (one or three) of right-hand check bits (lines l, n, v, or x). Any combination of one data bit error and one right-hand check bit error will cause a change in an odd number (three) of left hand check bits and an even number (zero, two, or four) of right-hand check bits (lines p, r, and t). A combination of one left-hand check bit error and one right-hand check bit error will cause a change in one right-hand check bit and one left-hand check bit (line g).

Each of these situations of two bit errors is clearly distinguishable from a single data bit error, which changes an odd number of right-hand check bits (one or three) and exactly three left-hand check bits.

The code will also detect any four bit errors occurring on a single chip. If the errors are on a data chip or the left-hand check bit chip, all four left-hand check bits, and no right-hand check bits, will be changed (line u). If the errors are on the right hand check bit chip, all four right-hand check bits, and no left-hand check bits, will be changed (line e). Note that in this case it may not be possible to distinguish the four bit errors from two bit errors on different chips.

Any three bit errors on a single chip can also be detected. When the errors are on a data chip, there will be one left-hand check bit change and one or three right-hand check bit changes (lines g and i); when on a left-hand check bit chip there will be three left-hand check bit changes and zero right-hand check bit changes (line p); when on a right-hand check bit chip there will be zero left-hand check bit changes and three right-hand check bit changes (line d).

A single right-hand check bit or left-hand check bit error is detectable as indicated on line b.

Line a reflects the fact that, if there are no syndrome bits set, there is no error in the data bits or the right-hand check bits. The remaining lines h, i, j, w, and y represent multiple bit errors which can also be detected.

Because the left-hand check bits are formed by exclusive ORing and the right-hand check bits by exclusive NORing, if all bits in all chips 0 through 9 are zero, an error will be detected.

Referring to FIG. 3, in a hardware implementation of the code, a left hand check bit generator 30 receives the data bits $D_0$ through $D_{31}$ from the data chips 0 through 7, and (using exclusive O Ring logic) produces the left-hand check bits $C_0$ through $C_3$, which are then stored in chip 8. A right-hand check bit generator 32 similarly produces right-hand check bits $C_4$ through $C_7$ using exclusive NORing logic and stores them in chip 9.

When the possibly corrupted data bits ($d_0$ through $d_{31}$) are later retrieved, the left-hand check bit generator 30 forms new left-hand check bits $C_0$ through $C_3$ and delivers them to a left-hand check bit comparator 34. The left-hand check bit comparator compares each of the new left-hand check bits $C_0$ through $C_3$ with the corresponding original left-hand check bits $C_0$ through $C_3$ and generates the corresponding left-hand syndrome bits $S_0$ through $S_3$. The right-hand check bit generator similarly generates new right-hand check bits $c_4$ through $c_7$ and those bits are compared with the original right-hand check bits $C_4$ through $C_7$ in a right-hand check bit comparator 36. The resulting right-hand syndrome bits $S_4$ through $S_7$ and the left-hand syndrome bits $S_0$ through $S_3$ are provided to a bit error detector 38.

The bit error detector counts the numbers of left-hand and right-hand syndrome bits which are set, and uses the table of FIG. 2 to determine whether an error exists. If so, it provides an error signal 40. If the error is a single bit data error, the bit error detector uses the matrix of FIG. 1 to determine which bit is erroneous, and delivers corresponding location bits $L_0$ through $L_5$ to a bit error corrector 42. Bit error corrector 42 then corrects the erroneous one of the bits $d_0$ through $d_{31}$ and delivers the corrected data word $D_0$ through $D_{31}$.

If no error exists the bit error corrector simply passes the $d_0$ through $d_{31}$ bits unchanged.

If the bit error detector identifies any other errors than a single bit error (lines g and s), it issues an uncorrectable signal 44 and blocks the bit error corrector from issuing any output bits.

Other embodiments are within the following claims.

I claim:

1. A method of detecting bit errors in a possibly corrupted version of an original data word, the bits of said original data word being organized in nibbles of four bits each, each nibble being stored in a single four-bit memory chip, in which a first set of four original check bits are derived from bits of the original data word, each check bit of the first set being based on a unique combination of data word bits, each data bit of a given nibble of the data word being used in forming each bit of a unique combination of exactly three of the check bits of the first set, a first set of four new check bits are derived from bits of the possibly corrupted version of the original data word, each new check bit of the first set corresponding to one of the original check bits, each new check bit being based on the same unique combination of bits as its corresponding original check bit, a first set of syndrome bits are formed by comparing each original check bit with the corresponding new check bit, the unique combinations of data word bits used for deriving the check bits being chosen so that the existence of any three bit errors or four bit errors within a single nibble of the possibly corrupted version will be detectable based on the syndrome bits.

2. The method of claim 1 in which each of the check bits of the first set is formed based on the same three bits of all nibbles.

3. The method of claim 1 in which a second set of four original check bits are derived from bits of the original data word, each check bit of the second set being based on a unique combination of data word bits, a second set of four new check bits are derived from bits of the possibly corrupted version of the original data word, each new check bit of the second set corresponding to one of the original check bits, each new check bit being based on the same unique combination of bits as its corresponding original check bit, a second set of syndrome bits are formed by comparing each original check bit with the corresponding new check bit, and the unique combinations of data word bits used for deriving the second set of check bits are chosen so that the existence of any three bit errors or four bit errors within a single nibble of the possibly corrupted version will be detectable based on the first and second sets of syndrome bits.

4. The method of claim 1 in which the unique combinations of data word bits are chosen so that any single bit error in the possibly corrupted version of the data word will result in different numbers of syndrome bits of the first set being set, than will any two bit errors in the possibly corrupted version.

5. The method of claim 1 in which there are 32 bits in the data word.

6. A method of detecting bit errors in a possibly corrupted version of an original data word, the bits of said original data word being organized in nibbles of four bits each, each nibble being stored in a single four-bit memory chip, in which a first set of four original check bits are derived from bits of the original data word, each check bit of the first set being based on a unique combination of data word bits, the four bits of each successive nibble of the data word being stored in order in the corresponding memory chip, and the first bits of all nibbles being used in forming the same three check bits, the second bits of all nibbles being used in forming the same three check bits, and so on, a first set of four new check bits are derived from bits of the possibly corrupted version of the original data word, each new check bit of the first set corresponding to one of the original check bits, each new check bit being based on the same unique combination of bits as its corresponding original check bit, a first set of syndrome bits are formed by comparing each original check bit with the corresponding new check bit, the unique combinations of data word bits used for deriving the check bits being chosen so that the existence of any three bit errors or four bit errors within a single nibble of the possibly corrupted version will be detectable based on the syndrome bits.

7. A method of detecting bit errors in a possibly corrupted version of an original data word, the bits of said original data word being organized in nibbles of four bits each, each nibble being stored in a single four-bit memory chip, in which a first set of four original check bits are derived from bits of the original data word, each check bit of the first set being based on a unique combination of data word bits, a first set of four new check bits are derived from bits of the possibly corrupted version of the original data word, each new check bit of the first set corresponding to one of the original check bits, each new check bit being based on the same unique combination of bits as its corresponding original check bit, a first set of syndrome bits are formed by comparing each original check bit with the corresponding new check bit, and the unique combinations of data word bits used for deriving the check bits are chosen so that the existence of any three bit errors or four bit errors within a single nibble of the possibly corrupted version will be detectable based on the syndrome bits, any four bit errors in the same nibble causing exactly four of the syndrome bits corresponding to the first set of check bits to be set.

8. The method of claim 1, 6, or 7 in which the unique combinations of data word bits used for deriving the check bits of the first set are defined by the left-hand side of the matrix of FIG. 1.

9. A method of detecting bit errors in a possibly corrupted version of an original data word, the bits of said original data word being organized in nibbles of four bits each, each nibble being stored in a single four-bit memory chip, in which a first set of four original check bits are derived from bits of the original data word, each check bit of the first set being based on a unique combination of data word bits, a first set of four new check bits are derived from bits of the possibly corrupted version of the original data word, each new check bit of the first set corresponding to one of the original check bits, each new check bit being based on the same unique combination of bits as its corresponding original check bit, a first set of syndrome bits are formed by comparing each original check bit with the corresponding new check bit, and the unique combinations of data word bits used for deriving the check bits are chosen so that the existence of any three bit errors or four bit errors within a single nibble of the possibly corrupted version will be detectable based on the syndrome bits, any three bit errors in the same nibble causing exactly one of the syndrome bits corresponding to the first set of check bits to be set.

10. A method of detecting bit errors in a possibly corrupted version of an original data word, the bits of said original data word being organized in nibbles of four bits each, each nibble being stored in a single four-bit memory chip, in which a first set of four original check bits are derived from bits of the original data word, each check bit of the first set being based on a unique combination of data word bits, a first set of four new check bits are derived from bits of the possibly corrupted version of the original data word, each new check bit of the first set corresponding to one of the original check bits, each new check bit being based on the same unique combination of bits as its corresponding original check bit, a first set of syndrome bits are formed by comparing each original check bit with the corresponding new check bit, and the unique combinations of data word bits used for deriving the check bits are chosen so that the existence of any three bit errors or four bit errors within a single nibble of the possibly corrupted version will be detectable based on the syndrome bits, the unique combinations of data word bits being chosen so that any single bit error in the possibly corrupted version of the data word will result in different numbers of syndrome bits of the first set being set, than will any two bit errors in the possibly corrupted version, any single bit error in the possibly corrupted version resulting in an odd number of syndrome bits of the first set being set, and any two bit errors in the possibly corrupted version resulting in an even number of syndrome bits of the first set being set.

11. A method of detecting bit errors in a possibly corrupted version of an original data word, the bits of said original data word being organized in nibbles of four bits each, each nibble being stored in a single four-bit memory chip, in which a first set of four original check bits are derived from bits of the original data word, each check bit of the first set being based on a unique combination of data word bits, a first set of four new check bits are derived from bits of the possibly corrupted version of the original data word, each new check bit of the first set corresponding to one of the original check bits, each new check bit being based on the same unique combination of bits as its corresponding original check bit, a first set of syndrome bits are formed by comparing each original check bit with the corresponding new check bit, and the unique combinations of data word bits used for deriving the check bits are chosen so that the existence of any three bit errors or four bit errors within a single nibble of the possibly corrupted version will be detectable based on the syndrome bits, the unique combinations of data word bits being chosen so that any single bit error in the possibly corrupted version of the data word will result in different numbers of syndrome bits of the first set being set, than will any two bit errors in the possibly corrupted version, any single bit error in the possibly corrupted version resulting in three syndrome bits of the first set being set, and any two bit errors in the possibly corrupted version resulting in zero or two syndrome bits of the first set being set.

12. The method of claim 1, 10, and 11 in which the unique combinations of data word bits used for deriving the two sets of check bits are chosen so that the identity of any single bit error in the data word can be determined based on the two sets of syndrome bits.

13. A method of detecting bit errors in a possibly corrupted version of an original data word, the bits of said original data word being organized in nibbles of four bits each, each nibble being stored in a single four-bit memory chip, in which a first set of four original check bits are derived from bits of the original data word, each check bit of the first set being based on a unique combination of data word bits, a first set of four new check bits are derived from bits of the possibly corrupted version of the original data word, each new check bit of the first set corresponding to one of the original check bits, each new check bit being based on the same unique combination of bits as its corresponding original check bit, a first set of syndrome bits are formed by comparing each original check bit with the corresponding new check bit, and the unique combinations of data word bits used for deriving the check bits are chosen so that the existence of any three bit errors or four bit errors within a single nibble of the possibly corrupted version will be detectable based on the syndrome bits, a second set of four original check bits being derived from bits of the original data word, each check bit of the second set being based on a unique combination of data word bits, a second set of four new check bits being derived from bits of the possibly corrupted version of the original data word, each new check bit of the second set corresponding to one of the original check bits, each new check bit being based on the same unique combination of bits as its corresponding original check bit, a second set of syndrome bits are formed by comparing each original check bit with the corresponding new check bit, the unique combinations of data word bits used for deriving the second set of check bits are chosen so that the existence of any three bit errors or four bit errors within a single nibble of the possibly corrupted version will be detectable based on the first and second sets of syndrome bits, and in which some of the check bits are formed by exclusive ORing and others of the check bits are formed by exclusive NORing.

14. The method of claim 13 in which it is the first set of check bits that are formed by exclusive ORing and the second set of check bits that are formed by exclusive NORing.

15. The method of claim 13 or 14 in which each data bit participates in the formation of an odd number of the check bits in the second set.

16. The method of claim 13 or 14 in which all data bits of a given nibble participate in the formation of the same check bits in the second set.

17. The method of claim 13 or 14 in which the data bits participate in the formation of the check bits in the second set in accordance with the right-hand side of the matrix of FIG. 1.

18. The method of claim 13 or 14 in which the unique combinations of data word bits used for deriving the two sets of check bits are chosen so that bit errors in possibly corrupted versions of the check bits can be detected.

19. Apparatus for detecting bit errors in a possibly corrupted version of an original data word, the bits of the original data word being organized in nibbles of four bits each, each nibble being stored in a single four-bit memory chip, comprising a check bit generator for deriving a first set of four original check bits from bits of the original data word, each check bit being based on a unique combination of data word bits, each data bit of a given nibble of the data word being used in forming each bit of a unique combination of exactly three of the check bits of the first set, said check bit generator also being connected to derive a first set of four new check bits from bits of the possibly corrupted version of the original data word, each new check bit corresponding to one of the original check bits, each new check bit being based on the same unique combination of bits as its corresponding original check bit, and a bit comparator for forming a first set of syndrome bits by comparing each original check bit with the corresponding new check bit, the unique combinations of data word bits used for deriving the check bits being chosen so that the existence of any three bit errors of four bit errors within a single nibble of the possibly corrupted version will be detectable based on the syndrome bits.

* * * * *